(12) United States Patent
Syamakumari et al.

(10) Patent No.: US 8,048,979 B2
(45) Date of Patent: Nov. 1, 2011

(54) PROCESS FOR SYNTHESIS OF TELECHELIC URETHANE ACRYLATE UV CURABLE PRE-POLYMERIC MATERIALS

(75) Inventors: Asha Syamakumari, Thiruvananthapuram (IN); Chennakkattu Krishna Sadasivan Pillai, Thiruvananthapuram (IN)

(73) Assignee: Council of Scientific and Industrial Research, New Delhi (IN)

( * ) Notice: Subject to any disclaimer, the term of this patent is extended or adjusted under 35 U.S.C. 154(b) by 404 days.

(21) Appl. No.: 12/097,478

(22) PCT Filed: Dec. 30, 2005

(86) PCT No.: PCT/IN2005/000454
§ 371 (c)(1),
(2), (4) Date: Dec. 17, 2008

(87) PCT Pub. No.: WO2007/077564
PCT Pub. Date: Jul. 12, 2007

(65) Prior Publication Data
US 2009/0306240 A1    Dec. 10, 2009

(51) Int. Cl.
*C08F 2/50* (2006.01)
*C08G 18/00* (2006.01)
*C08G 18/67* (2006.01)
*C08G 18/04* (2006.01)
*C08G 18/06* (2006.01)
*C08G 18/68* (2006.01)
*C08F 18/12* (2006.01)

(52) U.S. Cl. ............ 528/211; 528/44; 528/86; 528/212; 528/214; 528/217; 528/219; 528/59; 528/62; 528/162; 528/271; 528/367; 522/90; 522/97; 522/96; 522/173; 522/174; 522/178; 522/182; 522/183; 522/150; 522/152; 522/153; 522/154; 522/113; 522/114; 522/119; 522/120; 522/121

(58) Field of Classification Search .................. 522/152, 522/97, 174, 96, 90, 173, 178, 182, 183, 522/150, 153, 154, 113, 114, 119, 120, 121; 528/44, 86, 211, 212, 214, 217, 219, 59, 528/62, 162, 271, 367
See application file for complete search history.

(56) References Cited

U.S. PATENT DOCUMENTS

| | | | | | |
|---|---|---|---|---|---|
| 3,042,545 | A | * | 7/1962 | Kienle et al. | 427/386 |
| 3,061,650 | A | * | 10/1962 | Steckler et al. | 568/660 |
| 4,698,377 | A | | 10/1987 | Laitar | 523/143 |
| 6,051,623 | A | * | 4/2000 | Stielau | 521/170 |
| 6,765,079 | B2 | | 7/2004 | Saminathan | 526/322 |
| 7,244,772 | B2 | * | 7/2007 | Ittara et al. | 521/172 |
| 7,393,465 | B2 | * | 7/2008 | Niesten et al. | 252/182.25 |
| 2005/0192423 | A1 | * | 9/2005 | Niesten et al. | 528/49 |
| 2006/0004115 | A1 | * | 1/2006 | Ittara et al. | 521/155 |
| 2007/0175793 | A1 | * | 8/2007 | Narine et al. | 208/49 |
| 2009/0176940 | A1 | * | 7/2009 | Takano et al. | 525/247 |

FOREIGN PATENT DOCUMENTS

| | | |
|---|---|---|
| EP | 0 599 075 | 6/1994 |
| JP | 62-241914 | 10/1987 |
| JP | 63-097641 | 4/1988 |
| JP | 63-213512 | 9/1988 |
| JP | 63-264616 | 11/1988 |

OTHER PUBLICATIONS

Asha et al., "Synthesis and curing studies of PPG based telechelic urethane methacrylic macromonomers ," *Eur. Polym. J.*, 41:23-33, 2005.
Bhunia et al., "Synthesis and characterization of polymers from cashew nut shell liquid (CNSL), a renewable resource II. Synthesis of polyurethanes," *European Polymer Journal*, 35(8):1381-1391, 1999.
Bhunia et al., "Synthesis of polyurethane from cashew nut shell liquid (CNSL), a renewable resource ," *J. Polym. Sci. Part A: Polym Chem*, 36(3):391-400, 1998.
International Preliminary Report on Patentability issued in International Application No. PCT/IN2005/000454, mailed Jul. 10, 2008.
International Search Report issued in International Application No. PCT/IN2005/000454, mailed Sep. 11, 2006.
Jansen et al., "Fast monomers: factors affecting the inherent reactivity of acrylate monomers in photoinitiated acrylate polymerization," *Macromolecules*, 36(11):3861-3873, 2003.
Sathiyalekshmi and Gopalakrishnan, "Evaluation of performance of polyurethanes based on hydroxy alkylated cardanol formaldehyde resins under aging conditions," *Adv. Polym. Tech.*, 23:91-102, 2004.
Tan, "Cardanol-lignin-based polyurethanes," *Polym. International*, 41:13-16, 1996.

* cited by examiner

*Primary Examiner* — Sanza McClendon
(74) *Attorney, Agent, or Firm* — Fulbright & Jaworski LLP (57) ABSTRACT

The present invention involves the design of a radiation curable organic pre polymer resin material based on urethane acrylic linkage synthesized from the natural renewable resource cardanol or a derivative thereof, for coating application. These new molecules have a faster and better curing rate compared to the starting renewable resource—cardanol. This is brought about by the hydrogen bonding of the urethane linkage which leads to a pre organization of the molecules in such a way as to bring the cross linkable double bonds closer to each other. The present invention also involves a UV curable formulation of the above mentioned resins along with 2-10 parts by weight of a photopolymerization initiator. The resin, either in a formulation or alone turns into a cross linked film upon photopolymerization in presence of photoinitiator under a UV curable radiation source like a mercury vapor pressure lamp.

22 Claims, 4 Drawing Sheets

Figure 1. Represents the $^1$H-NMR spectra of the telechelic urethane methacrylate of cardanol, Isophorone diisocyanate (IPDI) and hydroxyethyl methacrylate (HEMA) in CDCl$_3$. The different types of the protons in the structure are assigned by alphabets.

Figure 2. Represents the FTIR spectra of Cardanol (a) before (dotted line) and (b) after 60 min UV irradiation in the presence of a photoinitiator using a home-made UV cure setup.

Figure 3. Represents the FTIR spectra of telechelic urethane methacrylate of cardanol-IPDI-HEMA (a) before (dotted line) and (b) after 60 min UV irradiation in the presence of a photoinitiator using a home-made UV cure setup.

Figure 4. Represents the FTIR spectra of telechelic urethane methacrylate of derivative of cardanol-HMDI-HEMA (a) before (dotted line) and (b) after 60 min UV irradiation in the presence of a photoinitiator using a home-made UV cure setup.

PROCESS FOR SYNTHESIS OF TELECHELIC URETHANE ACRYLATE UV CURABLE PRE-POLYMERIC MATERIALS

This Application is a National Phase Application of International Application No. PCT/IN2005/000454 filed Dec. 30, 2005.

FIELD OF INVENTION

The present invention relates to the design and synthesis of a UV radiation curable organic pre polymer based on urethane acrylic linkage synthesized from the natural renewable resources like cardanol or a derivative thereof.

BACKGROUND OF THE INVENTION

Cashew nut shell liquid (CNSL), which is a by product of the cashew industry, plays a significant role in the search for cost effective materials which are also renewable. Double distillation of CNSL yields cardanol—a phenol, having a C15 side chain that contributes flexibility, chemical resistance and adhesion in materials prepared from it. Due to this versatile nature, it finds applications in many areas like surface coatings, epoxy, varnishes, paints, printing inks, phenolic resins, rubber compounding, lacquers, laminates, friction materials, and adhesives. In general, CNSL and cardanol are used as phenolic resins by condensation with active hydrogen containing compounds like formaldehyde. In addition, the unsaturation in the C15 side chain makes it amenable to free radical polymerization in presence of commonly available thermal initiators and also to UV initiated polymerization in presence of suitable photoinitiators. However, the double bonds in the long alkyl side chain are not as reactive compared to an acrylic or methacrylic double bond. Functionalization of cardanol with acrylate or methacrylate moiety gives rise to cross linked polymers as reported in the U.S. Pat. No. 6,765,079 by Saminathan, M. et. al. However, cardanyl acrylate and methacrylate based crosslinkers are usually not very stable and often result in the formation of gels. Moreover, photopolymerization leads to shrinkage and the resultant stress causes defects in the bond line and in the resin matrix in the case of fully UV cured (meth)acrylate systems. Compared to free radical cured acrylate resins, polyurethane systems do not show shrinkage related stress. Dual cure coatings involving urethane acrylates combine the benefits of UV curing with that of a two component urethane system and overcome some of their limitations. The cured films are usually more flexible and adhere better to the substrate than 100% UV curable systems, probably because shrinkage is reduced. Acrylic resins with urethane side groups are capable of hydrogen bonding and they exhibit very fast polymerization rates as shown in Macromolecules, 36, (2003) 3861 by Jansen, J. F. G. A et al. Thus acrylic resins with urethane linkage have the added advantage of hydrogen bonding which leads to organization of the monomer units, which in turn increases the rate of polymerization, as illustrated in Eur. Polym. J. 41, (2004), 23 by Asha, S. K. et al. Although reports concerning polyurethanes based on cardanol formaldehyde resin are known, there are not many reports on urethanes synthesized directly from cardanol. Bhunia, H. P. et al. have reported the functionalization of cardanol to obtain a diazo monomer which upon further reaction with diisocyanates gave rise to polyurethane in the J. Polym. Sci: Part A: Polym Chem, 36 (1998) 391. The synthesis of polyurethanes using hydroxy alkylated cardanol formaldehyde as well as cardanol-lignin-formaldehyde resins are reported and the introduction of the urethane functionality has been shown to improve the thermal stability and mechanical properties of the final material as evidenced in the following references. Tan, T. T. M. Polym. International, 41 (1996) 13; Sathiyalekshmi, V et. al Adv. Polym. Tech. 23 (2004) 91. Some patents reported on the development of polymeric materials based on phenolic resin mixed with polyisocyanates and additives are also given in Japanese patent publications (1). Akio, I.; Shigetoshu, A.; Isao, K.; Kkazuuo, T. 62-241914, 1987. (2). Noriimasa, Y.; Noratake, S. 63-97641, 1988. (3). Tsutomu, N.; Koichi, K.; Yoshi, M.; Yuki. 63-213512, 1988. (4). Hisamitsu, I.; Yukio, S. 63-264616, 1988. (5). Laitar; Robert U.S. Pat. No. 4,698,377, 1987.

Thus, cardanol is known to have various potential industrial uses such as resins, surface coatings etc, and development of new applications or improvement of properties of materials based on cardanol by way of new molecular design is strongly desired. Therefore, it is advantageous to have coating compositions containing pre polymers based on cardanol, which combines the added advantage of having a urethane acrylic linkage incorporated in them. In the light of the foregoing discussion, the applicant proposes a UV curable telechelic urethane acrylic pre polymer, based on cardanol or derivative of cardanol.

OBJECTS OF THE INVENTION

It is therefore the main object of the invention to provide a process for the synthesis of telechelic urethane acrylate UV curable pre polymer materials from the natural material cardanol as well as its derivatives.

It is another object of the invention to provide a process for the curing of the pre polymer macromolecules in the presence of 2-10 parts by weight of photoinitiators under a source of UV irradiation.

Yet another object of the present invention is to make use of secondary interactions like the hydrogen bonding of urethane linkages to improve the curing rate.

SUMMARY OF THE INVENTION

Accordingly, the present invention provides a process for the synthesis of a resin based on telechelic urethane acrylate UV curable pre-polymer materials from renewable resources like cashew nut shell liquid (CNSL) for coating purposes, the process comprising the steps of

(a) coupling of one equivalent of the diisocyanate molecule represented by structure I with one equivalent of the hydroxy methacrylate molecule represented by structure II in order to obtain the molecule represented by structure III, (b) coupling of one equivalent of molecule represented by structure III with one equivalent of cardanol or its derivatives obtained from renewable resources represented by structure IV in the presence of organo metallic catalysts to obtain the final telechelic urethane acrylate UV curable pre polymer resin material represented by formula V, (c) curing of the telechelic urethane acrylate resin represented by the formula V in presence of 2-10 wt % of a photoinitiator under a UV curing source of radiation having wavelength 90-600 nm, and (d) formulating the above said resins with mono and multifunctional acrylic oligomers so as to get a resin formulation for coating on substrates.

Scheme 1

$R_1 = C_{15}H_{27}, C_{15}H_{31}, C_1$ to $C_{36}$, alkyl, cycloalkyl, aromatic, H
$R_2 = C_1$ to $C_{36}$, alkyl, cycloalkyl, aromatic, H
$R_3, R_4 = C_1$ to $C_{36}$, alkyl, cycloalkyl, aromatic
$R_5 = C_1$ to $C_{36}$, —$(CH_2CH_2O)_n$, alkyl, cycloalkyl, aromatic
$R_6 = CH_3$, H The present invention also provides a process for the synthesis of a resin based on telechelic urethane acrylate UV curable pre polymer materials from renewable resources like cashew nut shell liquid (CNSL) for coating purposes, the process comprising the steps of

(a) coupling of one equivalent of the diisocyanate molecule represented by structure I, in the scheme-2 below with one equivalent of cardanol or its derivatives obtained from renewable resources represented by structure IV in order to obtain the molecule represented by structure III″,

(b) coupling of one equivalent of molecule represented by structure III″ with one equivalent of hydroxy methacrylate molecule represented by structure II in the presence of organo metallic catalysts to obtain the final telechelic urethane acrylate UV curable pre polymer resin material represented by formula V, (c) curing of the telechelic urethane acrylate resin represented by the formula V in presence of 2-10 wt % of a photoinitiator under a UV curing source of radiation having wavelength 90-600 nm, and (d) formulating the above said resins with mono and multifunctional acrylic oligomers so as to get a resin formulation for coating on substrates.

Scheme 2

$R_1 = C_{15}H_{27}, C_{15}H_{31}, C_1$ to $C_{36}$, alkyl, cycloalkyl, aromatic, H
$R_2 = C_1$ to $C_{36}$, alkyl, cycloalkyl, aromatic, H
$R_3, R_4 = C_1$ to $C_{36}$, alkyl, cycloalkyl, aromatic
$R_5 = C_1$ to $C_{36}$, —$(CH_2CH_2O)_n$—, alkyl, cycloalkyl, aromatic
$R_6 = CH_3$, H

BRIEF DESCRIPTION OF THE DRAWINGS

The other features and advantages of the invention will become apparent from the description and the accompanying drawing in which.

DETAILED DESCRIPTION OF THE INVENTION

A preferred embodiment of the present invention will now be explained with reference to the accompanying drawings. It should be understood however that the disclosed embodiment is merely exemplary of the invention, which may be embodied in various forms. The following description and drawings are not to be construed as limiting the invention and the numerous specific details are described to provide a through understanding of the present invention, as the basis for the claims and as a basis for teaching one skilled in the art how to make and/or use the invention. However in certain instances, well-known or conventional details are not described in order not to unnecessarily obscure the present invention in detail.

Figure 1:
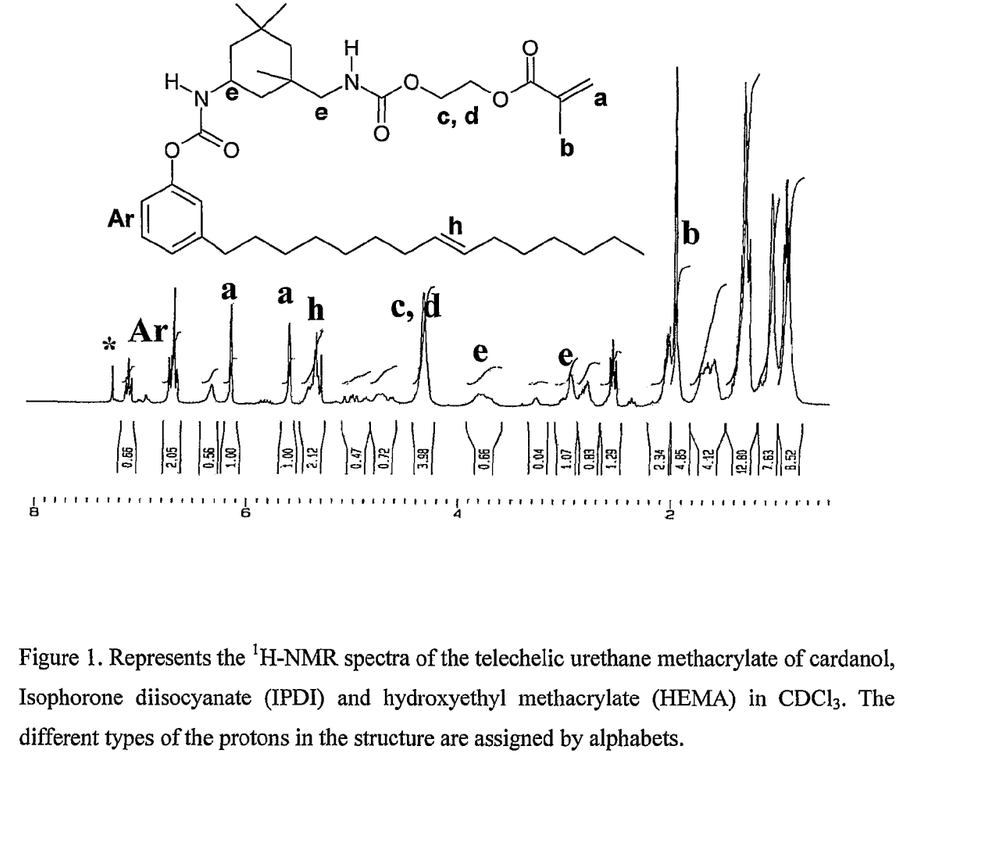
FIG. 1 represents the $^1$H-NMR spectra of the telechelic urethane methacrylate of cardanol, Isophorone diisocyanate (IPDI) and hydroxyethyl methacrylate (HEMA) in $CDCl_3$. The different types of the protons in the structure are assigned by alphabets.

The present invention essentially comprises of the synthesis of telechelic urethane acrylates (V) of cardanol as well as derivatives of cardanol as UV curable resins capable of enhanced curing rate brought about by the hydrogen bonding units inbuilt in their molecular design. Urethane acrylates based on both cardanol and derivatives of cardanol was synthesized as shown in scheme 1. The urethane methacrylate is produced from the reaction of a polyisocyanate with cardanol or derivatives of cardanol (represented by formula IV in scheme 1), and another compound containing at least one active hydrogen atom and at least one (meth)acryloyloxy group. These compounds are obtained by reacting one mole of an aromatic, aliphatic or cycloaliphatic diisocyanate represented by formula I with one mole of cardanol or derivatives of cardanol (IV), followed by coupling with one mole of a compound containing at least one active hydrogen atom and represented by the general structure II. The order of coupling could also be coupling of one equivalent of the compound having both active hydrogen as well as (meth)acryloyloxy group represented by formula II with one equivalent of the diisocyanate represented by formula I followed by coupling with one equivalent of the natural resource based compound represented by formula IV. FIG. 1 shows the structural characterization of telechelic urethane methacrylate of cardanol based on isophorone diisocyanate. The four aromatic protons of cardanol appear at 7.12 and 6.68 ppm, whereas the unsaturation in the side chain ('h') appears at 5.37 ppm respectively. The sharp, well separated peaks (labeled 'a') at 6.15 and 5.43 ppm corresponds to the methacrylic double bond protons, the peaks at 4.33 ('c, d') corresponds to the ethylene oxide protons (—$OCH_2CH_2OCO$—) of the hydroxy ethyl methacrylate part. Similarly, the other telechelic urethane methacrylates of cardanol as well as derivatives of cardanol were characterized using NMR spectroscopy.

The above described UV curable pre polymers could be used singly. It is however, preferred to use these in combination with compounds containing two or more (meth)acryloyloxy groups, which are useful as components capable of imparting better properties to the final coating and 2-10 parts by weight of photoinitiators in the presence of a UV curing source. The UV curable source could be low, medium or high pressure mercury lamp or xenon lamp having wavelength in the range 90-600 nm. The photoinitiators could be aromatic carbonyl compounds such as benzil, benzil dimethyl ketal, acetophenone, substituted acetophenones, thioxanthone or chlorothioxanthone in the range of 2-10 wt %. By varying the ratios of the various oligomers as well as optimizing the amount of photoinitiator used, the final film property of the cross linked material can be controlled. The above defined UV curable resin formulation could become a promising candidate in the coating or adhesive industry.

Figure 2:
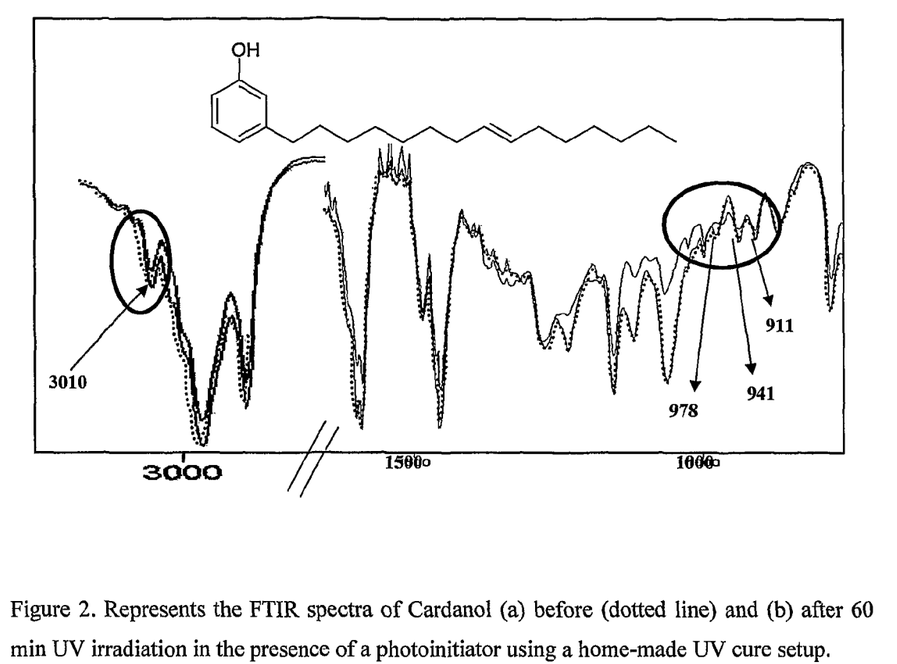
FIG. 2 represents the FTIR spectra of Cardanol (a) before (dotted line) and (b) after 60 min UV irradiation in the presence of a photoinitiator using a home-made UV cure setup.
Figure 3:
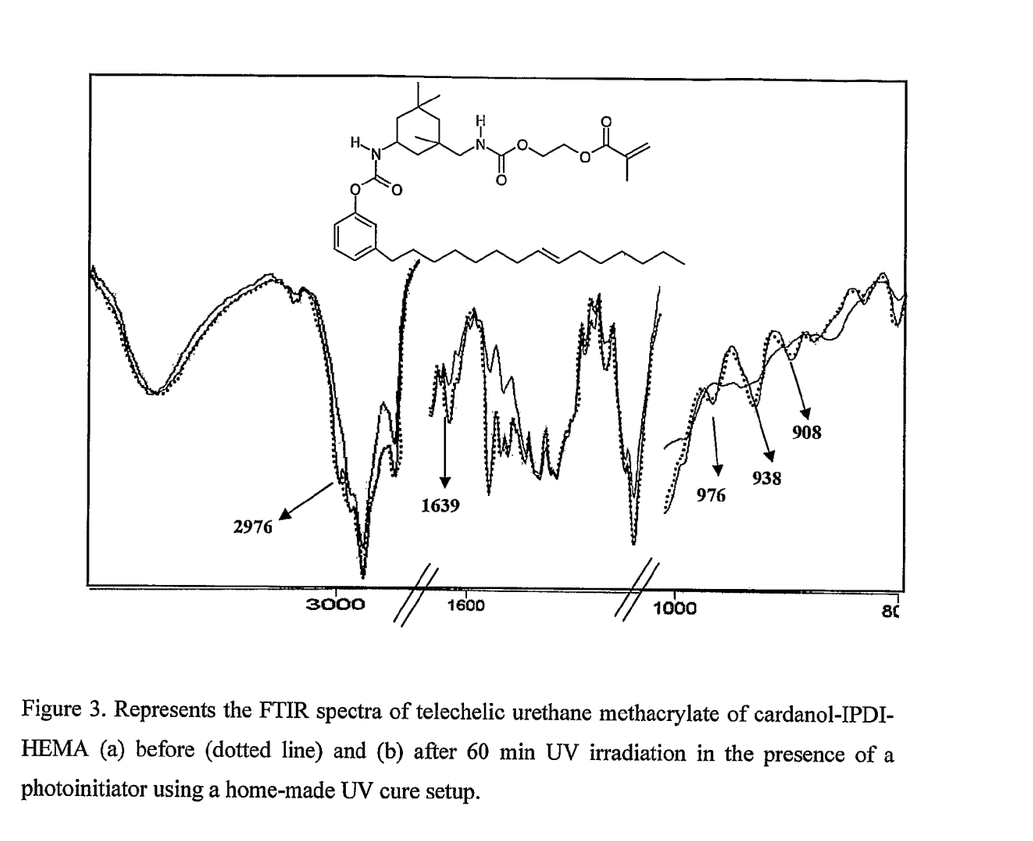
FIG. 3 represents the FTIR spectra of telechelic urethane methacrylate of cardanol-IPDI-HEMA (a) before (dotted line) and (b) after 60 min UV irradiation in the presence of a photoinitiator using a home-made UV cure setup.
Figure 4:
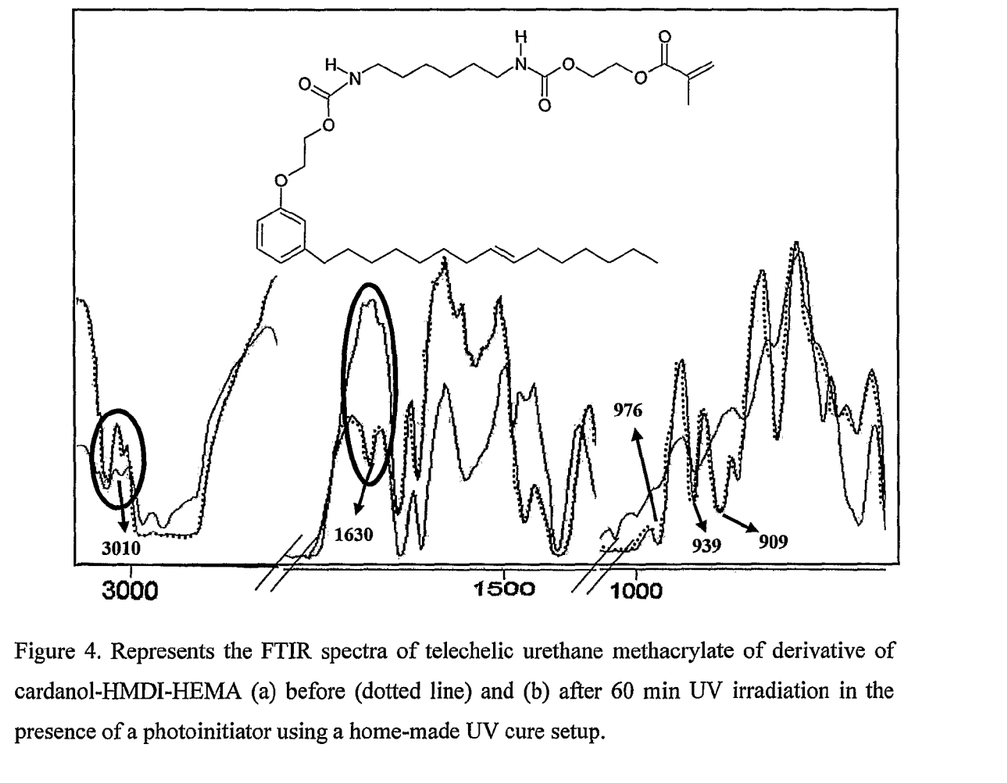
FIG. 4 represents the FTIR spectra of telechelic urethane methacrylate of Modified cardanol-HMDI-HEMA (a) before (dotted line) and (b) after 60 min UV irradiation in the presence of a photoinitiator using a home-made UV cure setup.

Cardanol as well as derivatives of cardanol has unsaturation in the side chain which can be cured using standard photoinitiators, under UV irradiation. However, irradiation of both cardanol and modified cardanol in presence of the photoinitiator under the same laboratory conditions inside a home-made UV curing setup showed that cardanol remained as a liquid without much curing happening, whereas the modified cardanol appeared like a transparent film; though still tacky, in a very short time. The curing kinetics could be followed by the disappearance of the peaks of unsaturation using an FTIR spectrometer. In cardanol the peak intensity did not vary much (FIG. 2), whereas in the telechelic urethane methacrylates of cardanol as well as derivatives of cardanol, the intensity of the above mentioned unsaturation peaks reduced drastically. Cardanol and its derivatives are known for their anti-oxidant properties as discussed in J. Chem. Soc. Perkin Trans, 2 (2001) 2142-2146 by Amorati, R.; et al., which explains the difficulty in its photoinduced curing process. In the urethane (meth)acrylate pre polymers (V), in addition to the unsaturation in the side chain, there is a polymerizable (meth)acryloyloxy group which also can undergo curing in presence of photoinitiators. Complete disappearance of the methacrylic double bond as observed in their FTIR spectra leads to the formation of a transparent film of the cross linked material. FIGS. 3-4 gives the FTIR spectra of the telechelic urethane methacrylates of cardanol as well as derivatives of cardanol with the peak positions labeled.

According to the present invention the UV curable telechelic urethane methacrylic resin are synthesized from the renewable resource cardanol as well as the derivatives of cardanol.

According to another aspect of the present invention UV curing of the above mentioned resins were carried out in the presence of an added photoinitiator, under a UV source from a home made UV cure setup.

The novel UV curable resins are directly prepared from renewable resource material cardanol. The present process combines the highly versatile polyurethane chemistry with the natural abundance of renewable resources.

UV curing technology is so well advanced now that there is a whole host of applications based on them, which we come across in our day to day life; for example wood finishings, floorings, dental adhesives, CD's, DVD's, printing ink etc. Economic concerns are the main driving force behind the adoption of UV curing technology. Increased production speed can lead to increase in sales, reduction in cost etc. Any molecular design strategy for the resin that can increase the curing rate will definitely lead to improved economy. Thus, the molecular design envisaged in this invention brings about faster cure rate compared to the parent resin, by virtue of hydrogen bonding which brings about a pre organization of the molecules whereby the (meth)/acrylic double bonds are brought closer to each other. The raw materials for the UV-curable resins are mostly based on petroleum based products, most of which are imported and are very expensive. The renewable resource based resins is very attractive compared to the petroleum-based ones because of large availability, low cost and ease of scale-up for industrial applications. The molecular design envisaged in this invention, incorporates hydrogen bonding urethane methacrylate units into the cardanol moiety, which has the added advantage that it incorporates weather resistant methacrylic units into the otherwise totally aromatic system.

The invention is described in detail in the following examples, which are given by way of illustration only and therefore should not be construed to limit the scope of the present invention.

EXAMPLE 1

Synthesis of Cardanol-IPDI-HEMA

Isophorone diisocyanate [IPDI] (0.73 g, 0.003 moles) in 10 ml dry DMF was taken in a 100 ml two necked flask. 2-Hydroxy ethyl methacrylate [HEMA][0.43 g, 0.003 moles] was added drop wise with constant stirring under nitrogen. The reaction mixture was allowed to proceed under room temperature for 1 and a half hours. Then 3 drops of dibutyl tin dilaurate [DBTDL] was added as catalyst followed by drop wise addition of cardanol (1 g, 0.0033 moles) in 10 ml DMF. It was left stirring at room temperature for further 2 hours. It was then heated to 55° C. and maintained at that temperature for 2 hours. Then, the contents were poured to 150 ml water and extracted with dichloromethane. It was then washed with plenty of water and dried in vacuum oven at 60° C. for 12 hours. Yield=90% (1.95 g)

EXAMPLE 2

Synthesis of Cardanol-IPDI-HEMA by Alternate Method

Isophorone diisocyanate [IPDI] (0.73 g, 0.003 moles) in 10 ml dry DMF was taken in a 100 ml two necked flask. Cardanol (1 g, 0.0033 moles) in 10 ml DMF was added drop wise with constant stirring under nitrogen. The reaction mixture was allowed to proceed under room temperature for 1 and a half hours. Then 3 drops of dibutyl tin dilaurate [DBTDL] was added as catalyst followed by drop wise addition of 2-Hydroxy ethyl methacrylate [HEMA][0.43 g, 0.003 moles]. It was left stirring at room temperature for further 2 hours. It was then heated to 55° C. and maintained at that temperature for 2 hours. Then, the contents were poured to 150 ml water and extracted with dichloromethane. It was then washed with plenty of water and dried in vacuum oven at 60° C. for 12 hours. Yield=90% (1.95 g)

EXAMPLE 3

Synthesis of Modified Cardanol-HMDI-HEMA

Cardanol was modified by coupling it with 2-chloroethanol in presence of $K_2CO_3$ and KI in DMF under inert atmosphere. Hexamethylene diisocyanate [HMDI] (0.49 g, 0.003 moles) in 10 ml dry DMF was taken in a 100 ml two necked flask and the contents were cooled with ice. HEMA (0.38 g, 0.003 moles) was added drop wise with constant stirring under nitrogen. The reaction was allowed to proceed under ice cold condition for 2 hr. Then the reaction was kept at room temperature for 1 hr. After that the reaction was changed to ice cold condition and 3 drops of DBTDL was added as catalyst followed by drop wise addition of modified cardanol (1 g, 0.003 moles) in 10 ml DMF. It was left stirring under cold condition for a further 1 hr and allowed to attain room temperature. Then the reaction was heated to 50° C. for 12 hrs. The contents were poured to 150 ml water and extracted with dichloromethane. It was then washed with plenty of water and dried in vacuum oven at 60° C. for 12 hrs. Yield=62% (1.17 g). The same synthetic procedure is adopted for all types of variation in the diisocyanate chemistry or in the hydroxy (meth)acryloxy chemistry or natural resource with active hydrogen atom to obtain the final UV curable telechelic pre polymer with varying R1, R2, R3, R4, R5 and R6.

Although the invention has been described with reference to the specific embodiment, this description is not meant to be construed in a limiting sense. Various modifications of the disclosed embodiments, as well as alternate embodiments of the invention will become apparent to persons skilled in the art upon reference to the description of the invention. It is therefore contemplated that such modifications can be made without departing from the spirit and scope of the present invention as defined in the appended claims.

We claim:

1. A process for the synthesis of a telechelic urethane acrylate UV curable prepolymer material comprising:
   (a) coupling one equivalent of the diisocyanate molecule represented by structure I, in the scheme-1 below with one equivalent of the hydroxy methacrylate molecule represented by structure II in order to obtain the molecule represented by structure III,
   (b) coupling of one equivalent of molecule represented by structure III with one equivalent of cardanol or a derivative thereof obtained from a renewable resources and represented by structure IV, in the presence of an organo metallic catalyst to obtain the final telechelic urethane acrylate UV curable pre polymer resin material represented by formula V:

Scheme 1

$R_1 = C_{15}H_{27}, C_{15}H_{31}, C_1$ to $C_{36}$ alkyl, cycloalkyl, aromatic or H; $R_6 = CH_3$ or H
$R_2 = C_1$ to $C_{36}$ alkyl, cycloalkyl, or H
$R_3, R_4 = C_1$ to $C_{36}$ alkyl, cycloalkyl or aromatic
$R_5 = C_1$ to $C_{36}$ ——$(CH_2CH_2O)_n$ alkyl, cycloalkyl or aromatic 2. A process for the synthesis of a telechelic urethane acrylate UV curable prepolymer material comprising the steps of:
   (a) coupling of one equivalent of the diisocyanate molecule represented by structure I, in the scheme-2 below with one equivalent of cardanol or its derivatives obtained from renewable resources represented by structure IV in order to obtain the molecule represented by structure III,
   (b) coupling of one equivalent of molecule represented by structure III'' with one equivalent of hydroxy methacrylate molecule represented by structure II in the presence of organo metallic catalysts to obtain the final telechelic urethane acrylate UV curable pre polymer resin material represented by formula V:

Scheme 2

$R_1 = C_{15}H_{27}, C_{15}H_{31}, C_1$ to $C_{36}$, alkyl, cycloalkyl, aromatic, H
$R_2 = C_1$ to $C_{36}$, alkyl, cycloalkyl, aromatic, H
$R_3, R_4 = C_1$ to $C_{36}$, alkyl, cycloalkyl, aromatic
$R_5 = C_1$ to $C_{36}$, —(CH$_2$CH$_2$O)$_n$, alkyl, cycloalkyl, aromatic
$R_6 = CH_3$, H 3. The process of claim 1 or 2 wherein the telechelic urethane acrylate material of formula V is cured in presence of 2-10 wt % of a photoinitiator under a UV curing source of radiation having wavelength 90-600 nm, and then formulated with mono and/or multifunctional oligomers to obtain a resin formulation for coating on substrates.

4. The process of claim 1 or 2 wherein the renewable resource has an active hydrogen atom.

5. A process as claimed in claim 4 wherein the renewable resource is selected from the group consisting of cardanol, saturated cardanol and urishiol.

6. The process of claim 1 or 2 wherein the renewable resource is a derivative of cardanol having $R_1$ as $C_{15}H_{29}$, $C_{15}H_{31}$ or any alkyl of 1 to 36 carbon atoms, $R_2$ as H or alkyl of 1 to 36 carbon atoms and $R_3$ as alkyl of 1 to 36 carbon atoms; aliphatic, aromatic or cycloaliphatic in structure IV.

7. The process of claim 1 or 2 wherein the diisocyanate has $R_4$ as alkyl of 1 to 36 carbon atoms with aliphatic, aromatic or cycloaliphatic, in structure I.

8. The process of claim 7 wherein the aromatic diisocyanate is selected from the group consisting of 2,4-toluene diisocyanate, 2,6-toluene diisocyanate, diphenylmethanediisocyanate, p-phenylene diisocyanate, polymethylene polyphenyl polyisocyanates or any polymeric derivatives of diphenylmethanediisocyanate.

9. The process of claim 7 wherein the aliphatic or cycloaliphatic diisocyanate is selected from the group consisting of hexamethylene diisocyanate, 2,2,4trimethylhexane-1,6-diisocyanate, 2,4,4-trimethylhexane-1,6-diisocyanate, isophoronediisocyanate, 1,4-cyclohexane diisocyanate, dicyclohexyl methane-4,4'-diisocyanate, an adduct of 1 molecule of 1,4-butane diol and 2 molecules of isophorone diisocyanate and an adduct of 1 molecule of 1,4-butane diol and 2 molecules of hexamethylene diisocyanate.

10. The process of claim 1 or 2 wherein the hydroxyl terminated acrylate has $R_5$ as alkyl of 1 to 36 carbon atoms; or (CH$_2$CH$_2$O)$_n$, and $R_6$ as hydrogen or alkyl of 1 to 36 carbon atoms in structure II.

11. The process of claim 10 wherein the hydroxy acrylate is selected from the group consisting of hydroxyethyl methacrylate, hydroxyethyl acrylate, 4-hydroxybutyl acrylate, 4-hydroxybutyl methacrylate, 2-hydroxypropyl acrylate, 3-hydroxypropyl methacrylate, hydroxyhexyl acrylate, poly (ethylene glycol) acrylate, poly(ethylene glycol) methacrylate and 12-hydroxydodecanyl acrylate.

12. The process of claim 1 or 2 wherein the isocyanate-hydroxyl coupling reaction is carried out at a temperature in the range of 0-100° C.

13. The process of claim 1 or 2 wherein the isocyanate-hydroxyl coupling reaction is carried out either without solvent (bulk), or in the presence of solvent selected from the group consisting of dimethyl formamide, tetrahydrofuran and dimethyl acetamide.

14. The process of claim 1 or 2 wherein the catalyst used for the isocyanate-hydroxyl coupling reaction is an organometallic catalyst having concentration in the range of 0.001-0.5 parts per 100 parts of active hydrogen-containing compound.

15. The process of claim 14 wherein the organometallic catalyst is an organotin catalyst.

16. The process of claim 15 wherein the organotin catalyst used is selected from the group consisting of dibutyl tin dilaurate, dibutyltin diacetate, dibutyltin maleate or dioctyltin diacetate.

17. The process of claim 1 or 2 wherein the photoinitiator used is an aromatic carbonyl compound.

18. The process of claim 17 wherein the photoinitiator used is selected from the group consisting of benzil, benzil dimethyl ketal, acetophenone, substituted acetophenones, thioxanthone and chlorothioxanthone.

19. The process of claim 3 wherein monofunctional oligomers selected from the group consisting of methyl acrylate, methyl methacrylate, ethyl acrylate, ethyl methacrylate and butyl acrylate are formulated.

20. The process of claim 3 wherein multifunctional oligomers selected from the group consisting of acrylic esters of aliphatic diols and/or polyols, ethylene diacrylate, trimethylol propane triacrylate and pentaerythritol tetraacrylate are formulated.

21. The process of claim 3 wherein the radiation source used is a high, medium or low-pressure mercury or xenon lamp.

22. The process of claim 1 or 2 wherein the curing of the prepolymer results in transparent pealable films.

* * * * *

UNITED STATES PATENT AND TRADEMARK OFFICE
CERTIFICATE OF CORRECTION

PATENT NO.       : 8,048,979 B2
APPLICATION NO.  : 12/097478
DATED            : November 1, 2011
INVENTOR(S)      : Asha Syamakumari et al.

Page 1 of 1

It is certified that error appears in the above-identified patent and that said Letters Patent is hereby corrected as shown below:

In claim 2, columns 9-10, lines 55-66, delete chemical drawings and insert

--  --, therefor.

Signed and Sealed this
Thirty-first Day of January, 2012

David J. Kappos
*Director of the United States Patent and Trademark Office*